United States Patent [19]

Gancy

[11] 4,425,251

[45] Jan. 10, 1984

[54] WATER-ACTIVATED EXOTHERMIC CHEMICAL FORMULATIONS

[76] Inventor: A. B. Gancy, 265 Robineau Rd., Syracuse, N.Y. 13207

[21] Appl. No.: 367,727

[22] Filed: Apr. 12, 1982

[51] Int. Cl.$^3$ ................................................. C09K 3/18
[52] U.S. Cl. ...................................... 252/70; 562/607; 423/430; 423/635; 126/263; 122/21
[58] Field of Search .......................... 252/70; 562/607; 423/430, 635; 126/263; 122/21

[56] References Cited

U.S. PATENT DOCUMENTS

| | | | |
|---|---|---|---|
| 4,057,047 | 11/1977 | Gossett | 126/263 |
| 4,067,313 | 1/1978 | Donnelly | 252/70 |
| 4,239,736 | 12/1980 | Fenske | 423/173 |

*Primary Examiner*—Richard L. Schilling
*Assistant Examiner*—Robert A. Wax

[57] ABSTRACT

Intimately mixed dry chemical formulations consisting of (1) a stable acid-acetate salt and (2) a chemical base for use as water-activated exothermic deicing agents, and/or as the dry chemical components of a warming device. The salt is optionally calcium monoacid acetate, sodium diacetate, or calcium magnesium monoacid acetate wherein up to 7 mol percent of the metal is magnesium. The chemical base is optionally calcium oxide or hydroxide, magnesium oxide or hydroxide, or calcined limestone. The relatively non-polluting formulations are pelletized or otherwise aggregated for application to roads, highways, walkways and parking lots as deicers.

21 Claims, No Drawings

WATER-ACTIVATED EXOTHERMIC CHEMICAL FORMULATIONS

The subject matter of the present invention is related to the subject matter of my two copending applications, Ser. Nos. 367,726 and 367,728.

BACKGROUND OF THE INVENTION

The present invention relates to dry chemical formulations which undergo a chemical change when contacted with water, ice or snow, liberating considerable heat during that chemical change. Furthermore, the chemical compounds resulting from that transformation are excellent deicing agents even in the absence of said heat effect. The formulations consist of an acid-acetate salt dry-blended with a chemical base. Such agents are environmentally safe compared with chloride-based deicing agents most commonly used to date.

DESCRIPTION OF THE PRIOR ART

Sodium chloride, or salt, is the most widely used road, highway and walkway deicer in the U.S. today. Over 12 million tons are used annually for that application alone. The use of salt is well known to be detrimental to the environment. It causes corrosion and consequent deterioration of bridge structures, and is corrosive to concrete roadbeds. It causes untold damage to motor vehicles due to corrosion of metal parts. It is damaging to soils, causing them to disperse and hence become subject to wind and water erosion. Salt enters into groundwaters, and works its way into drinking water supplies. The U.S. Environmental Protection Agency has made an indepth study of the problem, and has issued a major report which estimates that the societal cost of deicing with salt equals 14 times the cost of mining, distributing and applying the compound.

The EPA in cooperation with the U.S. Department of Transportation (DOT) is currently conducting major research and development programs designed to replace salt with a relatively non-polluting agent. Obviously such an agent would have to sell at a price the market, or at least a major portion of it, will bear.

In addition to its undesirable corrosive and damaging aspects, salt has still another undesirable characteristic. When it is applied to ice and snow, it "lowers the eutectic temperature," according to common parlance, which means that it lowers the normal freezing point, or freezing temperature of water. But in doing so, it also absorbs heat. In technical terms it is said to exhibit a "negative heat of solution" when dissolved in water. This absorption of heat obviously works in opposition to the eutectic temperature-lowering attribute.

The heat-absorption phenomenon characteristic of salt use only aggravates still another problem associated with the use of any deicer. In order for a deicer to work, heat must be absorbed from the surroundings. This heat is largely transmitted from beneath the actual highway or road surface. When this occurs, a stratum beneath the road surface which would normally be unfrozen—heated as it is from the depths of the earth—freezes and causes an insidious damage to roads and highways. This phenomenon is well documented in Federal DOT reports. Thus salt, due to its characteristic negative heat of solution, is rendered relatively less effective as a deicer, and does nothing to counteract the subsurface freezing phenomenon just described.

The other major deicer in use on the nation's roads, highways and walkways is calcium chloride. It is obtained as a by-product of the synthetic soda ash industry, and from processing of brines to manufacture magnesium chemicals. As such, it is more costly than salt. Less than ten percent of the total deicer market in the U.S. is comprised of calcium chloride.

Neglecting heat effects (heat of solution), use of calcium chloride results in an increased application of chloride to the environment. This in turn theoretically increases damage due to metallic corrosion, such as to motor vehicles and highway bridges. Calcium chloride is also known to be corrosive to portland cement concrete structures, especially those which have not been first "cured" for several months after construction. Thus calcium chloride has to be rated a bad actor along with salt. Its only obvious saving grace is that it does not contribute sodium to groundwaters.

Calcium chloride, however, exhibits a positive heat of solution in water, in total contrast to salt. More particularly, anhydrous calcium chloride, which has been stripped of all its hydrate water through a calcination process, produces a considerable amount of heat when it is dissolved in water. For this reason, it is difficult to make a precise comparison between the effectiveness of the two agents in a road deicing function. From freezing-point depression theory alone, i.e., without heat of solution effects, it can be shown that about 27 percent more calcium chloride is needed relative to salt to do a particular deicing job. When heat-of-solution effects are taken into account, the situation is reversed. One U.S. calcium chloride vendor makes the (unsubstantiated) claim that 25 pounds of its (calcium chloride) product is equivalent to 200 pounds of salt in a given deicing application.

Hence, heat-of-solution effects are considered important in chemical deicing. In simple terms, calcium chloride melts the ice and snow faster, pound for pound, than salt. Both are very damaging to the environment, however.

Thus there is a critical need wherever chemical deicing is practiced, in the U.S. and abroad, for a relatively non-polluting deicer the use of which results in an overall reduction in cost to society. Assuming the EPA report to be correct in its findings, the cost of manufacturing and applying a non-polluting deicer would have to be less than 14 times that of the corresponding cost of using salt. In practical marketing terms, however, a price factor of two or three may be all that is tolerated, and perhaps in some instances the factor may rise to as much as five.

In response to the need for a non-polluting deicer, the Federal DOT has sponsored research which led to the recent development of calcium magnesium acetate (CMA). This is an essentially equimolar mixture of calcium acetate and magnesium acetate, and can be represented as $CaMg(Ac)_4$. There are at least two reasons why CMA is not currently in use as a deicer. One is that the cost of manufacturing CMA is unclear, and this in turn is due to uncertainties in the synthesis. Certainly its cost using the best technology exceeds that of salt, and of calcium chloride. Efforts are under way to produce CMA from cellulose-rich solid municipal wastes, but a successful process may be many years in development.

A second potential problem with CMA is some limited evidence that it attacks portland cement concrete. I have theorized that this attack, if substantiated, may be due to the high concentration of magnesium in CMA. For this and other reasons, I advocate either a straight calcium acetate (CA) or a calcium acetate containing a limited amount of magnesium.

CMA or CA would be dramatically less polluting than salt or calcium chloride. In the first case, the acetate radical is relatively harmless (it is the main ingredient of vinegar). There is even some evidence that CMA is a metallic corrosion inhibitor, in contrast to chloride ion which is a most aggressive ion, to use the parlance of corrosion chemists and engineers. Calcium can be beneficial to soils because it has a binding effect, in contrast to the dispersing effect of the sodium in salt. In the long run CA or CMA would be biodegrade, with calcium carbonate or calcium magnesium carbonate as the ultimate end products, neither of which is harmful to the environment.

Thus there are some technical and economic questions connected with the use of CA and CMA, which remain to be resolved before these materials become commercialized on any reasonable scale.

As for required dosages in ice-melting, approximately twice as much CA would be required as salt to do the equivalent job arguing from freezing point depression theory alone. This ratio could drop slightly in actuality due to the fact that the heat of solution of CA is slightly positive, in contrast to that of salt which is negative. The chief reason for the higher CA dose requirement is the high molecular weight of the acetate ion, 59, in contrast to that of chloride ion which is about 35. This higher dose requirement for CA, it can be seen, aggravates the price differential over salt.

Thus there is good incentive to work in the area of acetate deicers, with a major preoccupation being cost reduction.

Other applications of the exothermic chemical formulations of the present invention include those in which heat is generated not for the purpose of melting ice, but of supplying warmth. Thus there exists a handwarmer containing anhydrous calcium chloride and water in adjoining compartments. When heat is desired, the membrane or seal separating the compartments is broken, the materals admix, and heat is transmitted through the walls of the container to the user. The dry formulations of the present invention can be used in the same manner, where they take the place of the calcium chloride.

OBJECTS OF THE INVENTION

It is an important object of the present invention to provide an environmentally safe substitute road deicing agent for salts such as sodium chloride and calcium chloride.

It is another object of the invention to provide stable chemical mixtures which when contacted with water undergo an exothermic reaction which provides heat to assist in the deicing function.

It is a still further object of this invention to provide means of stabilizing certain exothermic chemical formulations from premature chemical reaction during storage prior to use.

It is still another object of the invention to provide a dry chemical which when contacted with water will generate heat for the purpose of warming the body in emergency cold-weather situations.

SUMMARY OF THE INVENTION

Certain acid-acetate salts are dry-blended with selected chemical bases to provide the desired water-activated exothermic formulations. Included in the group of acid-acetate are calcium acid acetate, calcium/magnesium acid acetate, and sodium diacetate. Included in the group of chemical bases are calcium oxide, calcium hydroxide, magnesium oxide, magnesium hydroxide, unslaked calcined limestone, and (dried) slaked calcined limestone. The acid-salts and bases are, in each case, preferably blended in exact stoichiometric proportions, i.e., such that when reaction with water is complete, the acid-salts and bases have completely neutralized one another to produce a salt. The invention, however, is not limited to mixtures in exact stoichiometric proportions. Excess-acid as well as excess-base formulations may be useful under some end-use conditions. For example, calcium oxide or calcined limestone may be used in excess in any given formuation inasmuch as it generates heat itself when contacted with water; in such case the existence of a free calcium hydroxide in the environment would have been considered acceptable.

Dry mixtures are pelletized or otherwise aggregated and stored in such a way as not to contact liquid water. Certain mixtures are safely stored in contact with humid atmosphere. For deicing applications, the pellets of the present invention are applied to road surfaces in exactly the same way that salt and calcium chloride are normally applied.

When the pellets contact water (ice or snow), an acid-base neutralization reaction begins immediately, and heat is generated. The product of said neutralization is in each case a deicing agent in its own right, e.g., calcium acetate. Because some water is internally generated by the neutralization reaction itself, the exothermic process is auto-accelerated.

All of the formulations of the present invention are acetate-based, and as such are biodegradable to environmentally harmless carbonates. Inasmuch as no chlorides are present in these formulations, they do not corrode metals, and in some cases may even act as metallic corrosion inhibitors. Also, certain of the formulations can interact with acid rain to help nullify the environmentally harmful effects of the latter.

The heat-generating qualities of the formulations of invention provide a benefit in deicing applications analogous to that of anhydrous calcium chloride, i.e., that of doing the job with less chemical than would be required on the basis of freezing point depression theory alone. Thus, without consideration of thermal effects, about almost twice the amount of calcium acetate over the quantity of salt is required to do a given deicing job. This factor alone could make the economics of CA use very unfavorable. But salt actually absorbs heat during application, whereas the formulations of this invention generate considerable amounts of heat as a consequence of the acid-base neutralization reaction inherent in their functioning. Hence the factor above becomes less than two, and indeed may become fractional under certain application conditions. This improves the use economics considerably, and should more than offset the added cost of preparing the formulations, i.e., as opposed to the cost of preparing a straight calcium acetate deicing agent.

Indeed, in certain emergency situations, cost will not be the major factor in accomplishing the deicing treatment of roads, highways, bridges, walkways, or parking lots. Instead, speed will be a more important factor. The chemical formulations of the present invention provide an environmentally safe and rapid means of doing those jobs.

All such acid-acetate/base formulations are not stable in storage prior to use. In particular, calcium acid acetate is not stable when blended with calcium hydroxide. One feature of the present invention is the blend of calcium hydroxide with a calcium acid acetate in which up to 7 mol percent of the calcium has been replaced by the chemically equivalent amount of magnesium. This formulation is further stabilized against premature neutralization by the addition of calcium oxide or other drying agent.

DESCRIPTION OF PREFERRED EMBODIMENTS

The chemical literature lists several acid-acetates of calcium, each having a different acetic acid/calcium acetate mol ratio. I have succeeded in preparing a stable calcium monoacid acetate, or $Ca(Ac)_2.HAc$, and this is the subject of one of my copending applications. The concept which occurred to me is the dry-blending of such an acid-acetate and the appropriate amount of chemical base. If the blend were stable in storage, it had only to be activated by applying it to snow or ice. Thus,

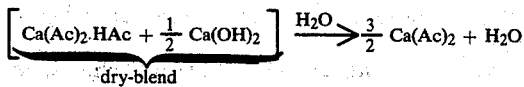

In this case, one mol of the acid salt would react completely with one-half mol of calcium hydroxide. The reaction is well known to chemists to be exothermic, or heat-producing. The product of the reaction is calcium acetate, a non-polluting deicing agent. Thus an in situ reaction is initiated as soon as the formulation of the present invention is contacted with snow or ice, to produce both heat and a chemical deicing agent. Note the auto-accelerating feature of the invention caused by the internal generation of water of neutralization.

Calcium hydroxide is chosen in the present case because it is an article of commerce, and is stable in ambient temperature. Surprisingly, however, I discovered that the mixture shown in the above equation was not stable in storage. The depicted neutralization reaction occurred spontaneously, without the addition of external water. It destabilized in storage between 5 minutes to an hour after blending, depending upon the particle size of the acid-acetate.

Further experiments were undertaken on the assumption that the "correct" crystalline modification of the acid-acetate would surely be unreactive towards calcium hydroxide in the dry. It is well known to analytical chemists, for example, that the properties of a hypothetical compound AB precipitated from solution could depend critically upon whether A was slowly added to a solution of B, or B was added to a solution of A. Sometimes A and B were added to the solution simultaneously to obtain the best results, each at a rate in proportion to its combining stoichiometry.

Thus, calcium acid acetate, or CAA was synthesized in a variety of ways. Acetic acid was slowly added to moist calcium acetate. The latter salt was slowly added to acetic acid. Acid strength was varied from 65 percent to 100 percent by weight. All these are variants of the following:

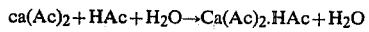

Water in all cases in a catalyst which is necessary for the reaction to go. Products were all dried to remove excess water. None of the products produced in this series was stable in contact with $Ca(OH)_2$.

In another series, many variants of the following reaction were carried out:

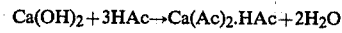

Neither were any of these dried products stable in contact with $Ca(OH)_2$.

A slight excess of acid was used over the stoichiometric requirement shown in the above reactions, with the notion that a product slightly richer in acid would possess a chemical stability due to a favorable modification of its crystalline structure. Surprisingly, however, any acid in excess over the 1:1 molar combining ratio is volatilized in the final product drying process. This net reaction is depicted as follows:

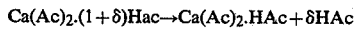

The product of this reaction was also unstable in contact with dry $Ca(OH)_2$.

Finally, a calcium acid acetate was produced by using a slight deficiency of the required 1 mol of acid per mol of calcium acetate. In actuality the product in this case is a mixture of CAA and (hydrated) calcium acetate after the final drying step. This product was also unstable in contact with $Ca(OH)_2$.

Hence there was not only no a priori reason to believe that an acid and base would be stable in admixture, but there was considerable experimental evidence that at least one acid-base pair was unstable.

Finely divided reagents were always carefully weighed into a small glass screw-top bottle. The bottle was sealed and the reagents blended for ~5 minutes by rotating and shaking the bottle. Instability was evident by the heating up of the mixture, and the condensation of moisture on the glass walls of the bottle. If the reaction took off while not under observation, e.g., during the night, the resulting mixture would be solidly caked instead of free-flowing. In any event, a positive test of a mixture's stability was made by introducing a weighed amount of water into the mixture and stirring with a thermometer. Peak temperature was recorded. Generally, blends were not found to be partially reacted. They were either fully reacted or completely stable (vide infra). The thermometer either registered a temperature rise or it didn't. The reason for this is doubtless the auto-accelerating feature of the invention due to internally generated water of neutralization.

Before abandoning the search for stable mixtures, I blended CAA with magnesium hydroxide in the proportion represented by the following:

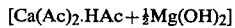

Surprisingly, this blend was indefinitely stable in sharp contrast to the analogous calcium blend. The following blends were then synthesized, and also found to be stable in storage indefinitely:

[Ca(Ac)$_2$.HAc + ½ MgO]
CAA     magnesium oxide

[Ca(Ac)$_2$.HAc + ½ CaO]
     calcium oxide

Furthermore, an acid acetate of sodium was also found to be completely compatible with calcium hydroxide, calcium oxide, magnesium hydroxide and magnesium oxide. The sodium compound contains about 3 mols of acetic acid per mol of sodium acetate, and also generally contains some hydrate water represented by the symbol x in the following representations of stable acid-base formulations. The sodium compound is called "sodium diacetate" in the trade.

[NaAc.3HAc.xH$_2$O + 1.5 Ca(OH)$_2$]

sodium diacetate

[NaAc.3HAc.xH$_2$O + 1.5 CaO]

[NaAc.3HAc.xH$_2$O + 1.5 Mg(OH)$_2$]

[NaAc.3HAc.xH$_2$O + 1.5 MgO]

[NaAc.3HAc.xH$_2$O + 1.5CaO]

[NaAc.3HAc.xH$_2$O + 1.5Mg(OH)$_2$]

[NaAc.3HAc.xH$_2$O + 1.5MgO]

The sodium compound contains a higher level of acetic acid (~40% by weight) than CAA. Hence the above exothermic blends generate more heat when activated than those based on CAA. All of the sodium diacetate-based blends react when contacted with liquid water to produce heat and deicing agents, for example

[NaAc.3HAc.xH$_2$O + 1.5 Mg(OH)$_2$] $\xrightarrow{H_2O}$

NaAc + 1.5 Mg(Ac)$_2$ + (3 + x) H$_2$O

In other words, the sodium acetate/magnesium acetate product is a deicing agent in its own right because it works to lower the eutectic temperature of water.

Encouraged by the forgoing results, I returned to the problem of CAA/calcium hydroxide blends which appeared to be unique in this series. The first resumption of effort centered on an attempt to synthesize a compound containing equimolar calcium and magnesium CaMg(Ac)$_4$.2HAc The attempt was based upon the fact well known to chemists and minerologists that the equimolar calcium, magnesium mineral carbonate known as dolomite possesses distinctive chemical properties, and does not behave as an equimolar mixture of calcium carbonate and magnesium carbonate. The analogous acid-acetate might have been stable in contact with calcium hydroxide.

The attempt to prepare the depicted acid-acetate was unsuccessful. Indeed, only when the mol ratio of magnesium to calcium was reduced to about 1:13 did the product retain the full complement of acid. Above this ratio the compounds are deficient in acetic acid, and are probably mixtures rather than discrete chemical compounds. The limiting magnesium/calcium ratio of 1:13 translates to about 7 mol percent magnesium. The following representation therefore depicts the highest level of magnesium which can be incorporated into CAA before it loses acid strength:

Ca$_{0.93}$Mg$_{0.07}$(Ac)$_2$.HAc

Hereinafter this compound will be referred to as calcium/magnesium acid acetate, or "CMAA." The compound and its preparation are subjects of one of my copending applications.

CMAA was blended with calcium hydroxide as follows:

[Ca$_{0.93}$Mg$_{0.07}$(Ac)$_2$.HAc+½Ca(OH)$_2$]

This blend, instead of spontaneously reacting within one hour, was stable in storage for several days. The incorporation of magnesium into CAA obviously conferred upon the latter a dramatically improved stability to reaction with calcium hydroxide. However, the reaction rate was not reduced to zero as evidenced by the fact that after several days the blend spontaneously and suddenly reacted to generate heat and water vapor, and became caked as eventually did all unstable mixtures. A very slow reaction had evidently produced water which accumulated in the closed system. When this accumulated water reached a critical concentration in the blend, the main reaction was triggered causing the auto-accelerated neutralization of (the remaining) acid and base.

It was postulated that even more prolonged storage stability may be achieved by capturing the water which was being slowly generated by the primary neutralization reaction. This would prevent internal water buildup, and prevent triggering of the auto-accelerated secondary reaction. Indeed, when calcium oxide, a known drying agent was introduced to the CMAA blend as partial replacement of the calcium hydroxide, a much improved storage stability was achieved.

The use of calcium oxide as a drying agent has at least two inherent advantages over other well known drying agents:

1. no new metals or ions are introduced into the blend; and
2. where calcium oxide actually replaces part of the calcium hydroxide normally used in the blend, less water is internally generated by the spontaneous, slow primary neutralization.

Other drying agents such as magnesium oxide, silica gel and activated alumina may be used in place of or in addition to calcium oxide as a means of prolonging storage stability of CMAA/Ca(OH)$_2$ blends.

A CMAA/Ca(OH)$_2$ blend in which 26 mol percent of the hydroxide was replaced by calcium oxide, for example, showed prolonged shelf life and is represented as follows:

[Ca$_{0.93}$Mg$_{0.07}$(Ac)$_2$.HAc+½(0.26CaO+0.74Ca(OH)$_2$)]

It is evident that the greater the proportion of calcium oxide to calcium hydroxide, the longer the blend will be stable in storage. Thus the ratio actually used will depend upon the particular demands of storage stability, and upon the economics of the situation, i.e., the relative costs of calcium oxide and calcium hydroxide.

Calcined limestone may be used as the base in any of the blends of the present invention. In such case, the appropriate blend of slaked and unslaked calcined limestone may be used to form a blend with CMAA. An incompletely slaked calcium limestone would obviously also be appropriate to blend with CMAA to form an exothermic formulation, exhibiting the appropriate storage stability.

Although this invention has been described in connection with specific forms thereof, it will be appreciated by those skilled in the art that a wide variety of equivalents may be substituted for those specific elements and steps of operation shown and described herein, that certain features may be used independently of other features, and that parts may be reversed, all without departing from the spirit and scope of this invention as defined in the appended claims.

I claim:

1. The dry-blend of sodium diacetate with a chemical base which is unreactive towards the sodium diacetate until the blend is activated by the introduction of water.

2. The formulation of claim 1 wherein the chemical base is calcium oxide.

3. The formulation of claim 1 wherein the chemical base is magnesium oxide.

4. The formulation of claim 1 wherein the chemical base is magnesium hydroxide.

5. The formulation of claim 1 wherein the chemical base is calcium hydroxide.

6. The formulation of claim 1 wherein the chemical base is calcined limestone.

7. The formulation of claim 1 wherein the amount of chemical base is stoichiometrically equivalent to the amount of acid in the acid-acetate.

8. A chemical deicer comprising the formulation of claim 1 in pelletized, flaked or otherwise aggregated form.

9. A warming device consisting of two chambers separated by a barrier, one chamber containing a dry-blend of sodium diacetate with a chemical base which is unreactive to the sodium diacetate until water-activated, and the other compartment containing water, activation of which device is accomplished through disruption of said barrier so as to allow admixture of water and said dry-blend.

10. The dry blend of calcium monoacid acetate with a chemical base which is unreactive towards the calcium monoacid acetate until the blend is activated by the introduction of water.

11. The formulation of claim 10 wherein the chemical base is calcium oxide.

12. The formulation of claim 10 wherein the chemical base is magnesium oxide.

13. The formulation of claim 10 wherein the chemical base is magnesium hydroxide.

14. The formulation of claim 10 wherein the chemical base is calcined limestone.

15. The formulation of claim 10 wherein the amount of chemical base is stoichiometrically equivalent to the amount of acid in the acid-acetate.

16. A chemical deicer comprising the formulation of claim 10 in pelletized, flaked or otherwise aggregated form.

17. A warming device consisting of two chambers separated by a barrier, one chamber containing a dry-blend of calcium mono-acetate with a chemical base which is unreactive to the calcium mono-acetate until water-activated, and the other compartment containing water, activation of which device is accomplished through disruption of said barrier so as to allow admixture of water and said dry-blend.

18. The dry blend of calcium magnesium monoacid acetate with calcium hydroxide.

19. The formulation of claim 18 wherein up to 7 mol percent of the metal in the acid-acetate is magnesium.

20. The formulation of claim 19 wherein up to 50 mol percent of the calcium hydroxide has been replaced by calcium oxide.

21. The formulation of claim 19 to which has been added a chemical drying agent.

* * * * *